May 12, 1942.   O. E. KUHLMAN ET AL   2,283,119
FRUIT JUICE EXTRACTOR
Original Filed Jan. 29, 1940
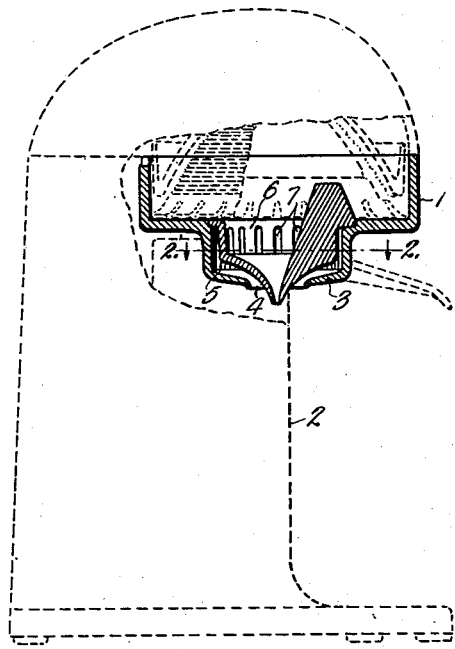
Fig. 1.
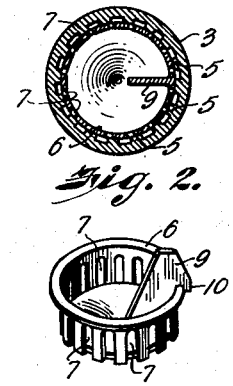
Fig. 2.
Fig. 3.
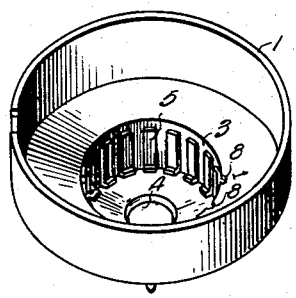
Fig. 4.
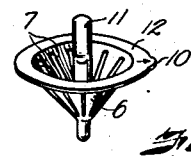
Fig. 7.
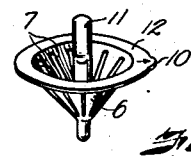
Fig. 5.
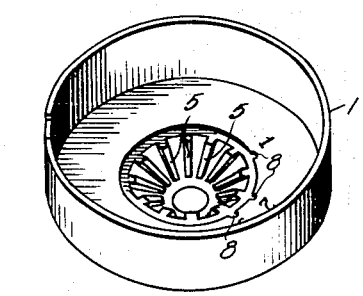
Fig. 8.
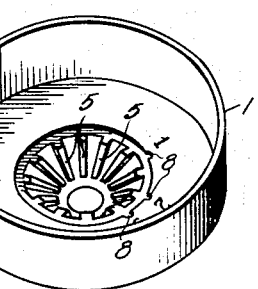
Fig. 6.
INVENTORS
Orville E. Kuhlman
Joseph Majewski, Jr.
BY
ATTORNEY Patented May 12, 1942

2,283,119

UNITED STATES PATENT OFFICE 2,283,119

FRUIT JUICE EXTRACTOR

Orville E. Kuhlman and Joseph M. Majewski, Jr., Kansas City, Mo., assignors to Foster L. Talge, operating as Rival Manufacturing Company, Kansas City, Mo.

Original application January 29, 1940, Serial No. 316,156. Divided and this application January 8, 1941, Serial No. 373,624

1 Claim. (Cl. 210—155)

Our invention relates to fruit juice extractors and more particularly to a novel strainer to be used in connection with fruit juice extractors for the squeezing of oranges, lemons, grapefruit, and the like.

This application is a divisional application of our co-pending case, Serial No. 316,156, filed January 29, 1940.

Most fruit juice extractors of the prior art are provided with strainers which permit a certain amount of pulp to pass through the strainer openings. For adult persons, this does not constitute a major disadvantage and, as a matter of fact, is frequently desirable. Orange juice, however, for example, is often prescribed for infants and is fed to them through bottles, equipped with nipples. The presence of pulp often clogs the openings of the nipple in the bottle.

In the pressure type of fruit juice extractors, when the upper pressing member is lifted, the lower pressing member will likewise lift at times, due to suction, and permit large pieces of pulp to pass into the fruit juice.

One object of our invention is to provide a novel juice extractor in which the extracted juice may be obtained having considerable pulp, a modicum of pulp, or substantially no pulp, at the will of the operator.

Another object of our invention is to provide a novel fruit juice extractor having an adjustable strainer.

Other and further objects of our invention will appear from the following description.

In the accompanying drawing which forms part of the instant specification and is to be read in conjunction therewith and in which like reference numerals are used to indicate like parts in the various views:

Figure 1 is a sectional view of a strainer for a fruit juice extractor, with the fruit juice extractor in which the strainer is used shown in dotted lines.

Figure 2 is a fragmentary sectional view, taken on the line 2—2 of Figure 1.

Figure 3 is a perspective view of a portion of the strainer assembly.

Figure 4 is a perspective view showing the juice receiving cup and another portion of the strainer assembly.

Figure 5 is a top plan view of a juice receiving cup and strainer assembly showing another embodiment of our invention.

Figure 6 is a sectional view taken on the line 6—6 of Figure 5.

Figure 7 is a perspective view of a portion of the strainer assembly of the form shown in Figure 5.

Figure 8 is a perspective view of the fruit juice receiving member and a portion of the strainer assembly, with the element shown in Figure 7 removed.

Referring now to the drawing and more particularly to Figure 1, a fruit juice receiving cup 1 is supported in any suitable manner in a fruit juice extractor 2. The bottom of the cup is formed with a sump 3 provided with a juice draining opening 4 and a plurality of spaced ribs 5. An adjustable strainer member 6 is provided with a plurality of slotted openings 7, as can readily be seen by reference to Figures 2 and 3. The cup 1 is formed with a plurality of reentrant portions 8, marked "1," "2," and "3," respectively. The strainer portion 6 is provided with a fin 9, having a projection 10 adapted to be seated in one of the reentrant portions 8. The width of the slots 7 is exactly equal to the width of the projections 5 so that, when the slots are opposite the projections, the projections will seal the slots permitting no juice to pass, it being understood, of course, that the strainer member 6 fits closely in the sump upon the projections 5, as can readily be seen by reference to Figure 2.

The positions of the reentrant portions 20 are such that, when the projection is in the reentrant portion marked "1," the slots 7 are directly opposite the spaces between projections 5. This permits all of the juice which passes through the strainer openings of the primary fruit juice strainer to pass into the sump and out of the drain openings 4.

When the projection 10 is in the reentrant portion 8 marked "2," about half of each slot 7 is blanked off by the corresponding projections 5. The straining openings of the adjustable strainer are thus reduced, permitting only the finest pulp to go through. This is sometimes desirable, for those who do not like coarse pulp, such as for invalids.

When the projection 10 is in the reentrant portion 8 marked "3" the position of the parts is that shown in Figure 2, that is, the slots 7 are almost completely blanked off by the projections 5, leaving only very slight openings through which substantially no pulp passes, thus permitting only the juice to drain off.

In the form of the invention shown in Figures 1, 2, 3, and 4, the sump is provided with substantially vertical side walls and substantially vertical projections 5.

In the form of the invention shown in Figures 5, 6, 7, and 8 inclusive, the fruit juice receiving cup 1 is not made of metal but a suitable plastic material, and the sump 3 is provided with tapered side walls of frusto-conical shape. The projections 5 are formed, of course, on the internal side walls of the sump and the strainer takes the form shown in Figure 7. It is provided with a central projection 11, adapted to adjust the strainer to its different positions. The projection 10 is formed around the flange 12 of the strainer 6. The slots 7 are formed as before and the action is identical with that described.

It will be seen that we have accomplished the objects of our invention. We have provided a novel fruit juice extractor in which the quality of the juice, with respect to the amount and character of the pulp, may be governed to meet the tastes of the user. Mothers may use our fruit juice extractor strainer to produce a strained juice which may be put in babies' bottles and fed to infants through nipples without the annoyance of having the nipples become clogged. The strainer may be easily disassembled for cleaning.

It will be understood that certain features and sub-combinations are of utility and may be employed without reference to other features and sub-combinations. This is contemplated by and is within the scope of our claim. It is further obvious that various changes may be made in details within the scope of our claim without departing from the spirit of our invention. It is, therefore, to be understood that our invention is not to be limited to the specific details shown and described.

Having thus described our invention, we claim:

In a juice extractor, a juice receiving cup formed with a sump, projections in said sump, a cup-shaped strainer positioned in said sump, said strainer being formed with slots and means for moving said strainer to predetermined positions, the said projections being arranged to close a predetermined portion of the slots in each of the said positions to vary the effective openings of said slots.

JOSEPH M. MAJEWSKI, Jr.
ORVILLE E. KUHLMAN.